(12) United States Patent
Sato et al.

(10) Patent No.: US 10,419,417 B2
(45) Date of Patent: Sep. 17, 2019

(54) AUTHENTICATION SYSTEM AND AUTHENTICATION METHOD CAPABLE OF REALIZING SINGLE-SIGN-ON FUNCTION USED FOR APPLICATION PROGRAM ON IMAGE FORMING APPARATUS

(71) Applicant: KYOCERA DOCUMENT SOLUTIONS INC., Osaka (JP)

(72) Inventors: Masafumi Sato, Osaka (JP); Zhenyu Sun, Osaka (JP); Takashi Oguma, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 23 days.

(21) Appl. No.: 15/705,794

(22) Filed: Sep. 15, 2017

(65) Prior Publication Data

US 2018/0083953 A1    Mar. 22, 2018

(30) Foreign Application Priority Data

Sep. 21, 2016  (JP) ................................ 2016-183774

(51) Int. Cl.
  *H04L 29/06*   (2006.01)
  *G06F 21/60*   (2013.01)
  *G06F 21/41*   (2013.01)

(52) U.S. Cl.
  CPC .......... *H04L 63/0815* (2013.01); *G06F 21/41* (2013.01); *G06F 21/608* (2013.01); *H04L 63/083* (2013.01)

(58) Field of Classification Search
  CPC ... H04L 63/0815; H04L 63/083; G06F 21/41; G06F 21/608
  See application file for complete search history.

(56) References Cited

U.S. PATENT DOCUMENTS

| | | | | |
|---|---|---|---|---|
| 6,131,120 A * | 10/2000 | Reid | ................ | H04L 29/12009 709/225 |
| 7,502,754 B2 * | 3/2009 | Campbell | .............. | G06Q 30/04 380/255 |
| 10,133,525 B2 * | 11/2018 | Nathani | ................ | G06F 3/1222 |
| 2004/0179713 A1 * | 9/2004 | Tani | ...................... | H04N 7/163 382/100 |

(Continued)

FOREIGN PATENT DOCUMENTS

JP    2005-346570 A    12/2005

*Primary Examiner* — Ghodrat Jamshidi
(74) *Attorney, Agent, or Firm* — Li & Cai Intellectual Property (USA) Office

(57) ABSTRACT

The management server authenticates the user on the basis of the authentication request using the user name and the password received from the image forming apparatus, generates user session information obtained in a process of the user authentication process, stores the user session information in association with the IP address of the image forming apparatus in the third memory, and supplies the user session information in response to an inquiry using the IP address from the third party server. The third party server receives the authentication request using the IP address from the image forming apparatus, makes an inquiry to the management server by using the IP address, and authenticates the user on the basis of the returned user session information.

4 Claims, 6 Drawing Sheets

(56) References Cited

U.S. PATENT DOCUMENTS

| | | | | |
|---|---|---|---|---|
| 2005/0021956 A1* | 1/2005 | Genty | ............ | G06F 21/41 |
| | | | | 713/170 |
| 2006/0119883 A1* | 6/2006 | Lovat | ............ | G03G 15/5091 |
| | | | | 358/1.15 |
| 2006/0130122 A1* | 6/2006 | Konno | ............ | H04L 63/0823 |
| | | | | 726/2 |
| 2008/0010288 A1* | 1/2008 | Hinton | ............ | G06F 17/30545 |
| 2010/0149570 A1* | 6/2010 | Kamiya | ............ | G06F 21/10 |
| | | | | 358/1.13 |
| 2010/0157363 A1* | 6/2010 | Ishikawa | ............ | G06F 3/1203 |
| | | | | 358/1.15 |
| 2013/0007207 A1* | 1/2013 | Dietrich | ............ | G06F 16/183 |
| | | | | 709/217 |
| 2014/0068743 A1* | 3/2014 | Marcus | ............ | G06F 21/33 |
| | | | | 726/8 |
| 2014/0320883 A1* | 10/2014 | Ichida | ............ | G07F 17/26 |
| | | | | 358/1.14 |
| 2016/0054962 A1* | 2/2016 | Park | ............ | H04L 41/0806 |
| | | | | 358/1.15 |
| 2016/0155093 A1* | 6/2016 | Shibata | ............ | G06Q 10/1091 |
| | | | | 705/32 |
| 2016/0328187 A1* | 11/2016 | Nathani | ............ | H04W 4/02 |
| 2017/0149767 A1* | 5/2017 | Hinton | ............ | H04L 63/0815 |

\* cited by examiner

AUTHENTICATION SYSTEM AND AUTHENTICATION METHOD CAPABLE OF REALIZING SINGLE-SIGN-ON FUNCTION USED FOR APPLICATION PROGRAM ON IMAGE FORMING APPARATUS

CROSS REFERENCE TO RELATED APPLICATION

This application claims the benefit of Japanese Priority Patent Application JP 2016-183774 filed Sep. 21, 2016, the entire contents of which are incorporated herein by reference.

BACKGROUND OF THE INVENTION

1. Field of the Invention

The present disclosure relates to single-sign-on to a plurality of application programs that an image forming apparatus (MFP, Multifunction Peripheral) executes.

2. Description of Related Art

In the past, in order to use a plurality of application services, it is necessary to log in to the respective application services, which is troublesome.

In view of this, there is known a single-sign-on method that enables use of a plurality of application services with single login.

However, a single-sign-on method for a typical web application server is complicated since there is no use environment limitation.

It is desirable to provide an authentication system and an authentication method.

SUMMARY OF THE INVENTION

According to an embodiment of the present disclosure, there is provided an authentication system, including:
a management server;
an image forming apparatus; and
a third party server, in which
the image forming apparatus includes
a first communication device capable of communicating via a network,
an operation device,
a display device,
a first memory that stores a management client program that operates in cooperation with the management server,
a second memory that stores a third party client program that operates in cooperation with the third party server, and
a first processor that executes the management client program and the third party client program,
when the first processor executes the management client program, the first processor
receives login of a user,
sends an authentication request to the management server by using the received user name and password, and
starts up the third party client program on the basis of an instruction input by a user via the operation device,
when the first processor executes the third party client program, the first processor
obtains an IP address of the image forming apparatus, the third party client program being running on the image forming apparatus, and
sends the IP address and an authentication request together to the third party server,
the management server includes
a second communication device capable of communicating via the network,
a third memory,
a fourth memory that stores a management server program, and
a second processor that executes the management server program,
when the second processor executes the management server program, the second processor
authenticates the user on the basis of the authentication request using the user name and the password received from the image forming apparatus,
generates user session information obtained in a process of the user authentication process,
stores the user session information in association with the IP address of the image forming apparatus in the third memory, and
supplies the user session information in response to an inquiry using the IP address from the third party server,
the third party server includes
a third communication device capable of communicating via the network,
a fifth memory that stores a third party server program, and
a third processor that executes the third party server program, and
when the third processor executes the third party server program, the third processor
receives the authentication request using the IP address from the image forming apparatus,
makes an inquiry to the management server by using the IP address, and
authenticates the user on the basis of the returned user session information.

According to an embodiment of the present disclosure, there is provided an authentication method of an authentication system including a management server, an image forming apparatus, and a third party server connected to a network, the authentication method including:
via the image forming apparatus, receiving login of a user;
via the image forming apparatus, sending an authentication request to the management server by using the received user name and password;
via the management server, authenticating the user on the basis of the authentication request using the user name and the password received from the image forming apparatus, generating user session information obtained in a process of the user authentication process, and storing the user session information in association with the IP address of the image forming apparatus in the memory device;
via the image forming apparatus, starting up the third party client program on the basis of an instruction input by a user via the operation device;
when executing the third party client program, obtaining an IP address of the image forming apparatus, the third party client program being running on the image forming apparatus;
when executing the third party client program, sending the IP address and an authentication request together to the third party server;

via the third party server, receiving the authentication request using the IP address from the image forming apparatus, and making an inquiry to the management server by using the IP address;

via the management server, supplying the user session information in response to an inquiry using the IP address from the third party server; and via the third party server, authenticating the user on the basis of the returned user session information.

These and other objects, features and advantages of the present disclosure will become more apparent in light of the following detailed description of best mode embodiments thereof, as illustrated in the accompanying drawings.

DETAILED DESCRIPTION OF THE PREFERRED EMBODIMENTS

Hereinafter, an embodiment of the present disclosure will be described with reference to the drawings.

Figure 1:
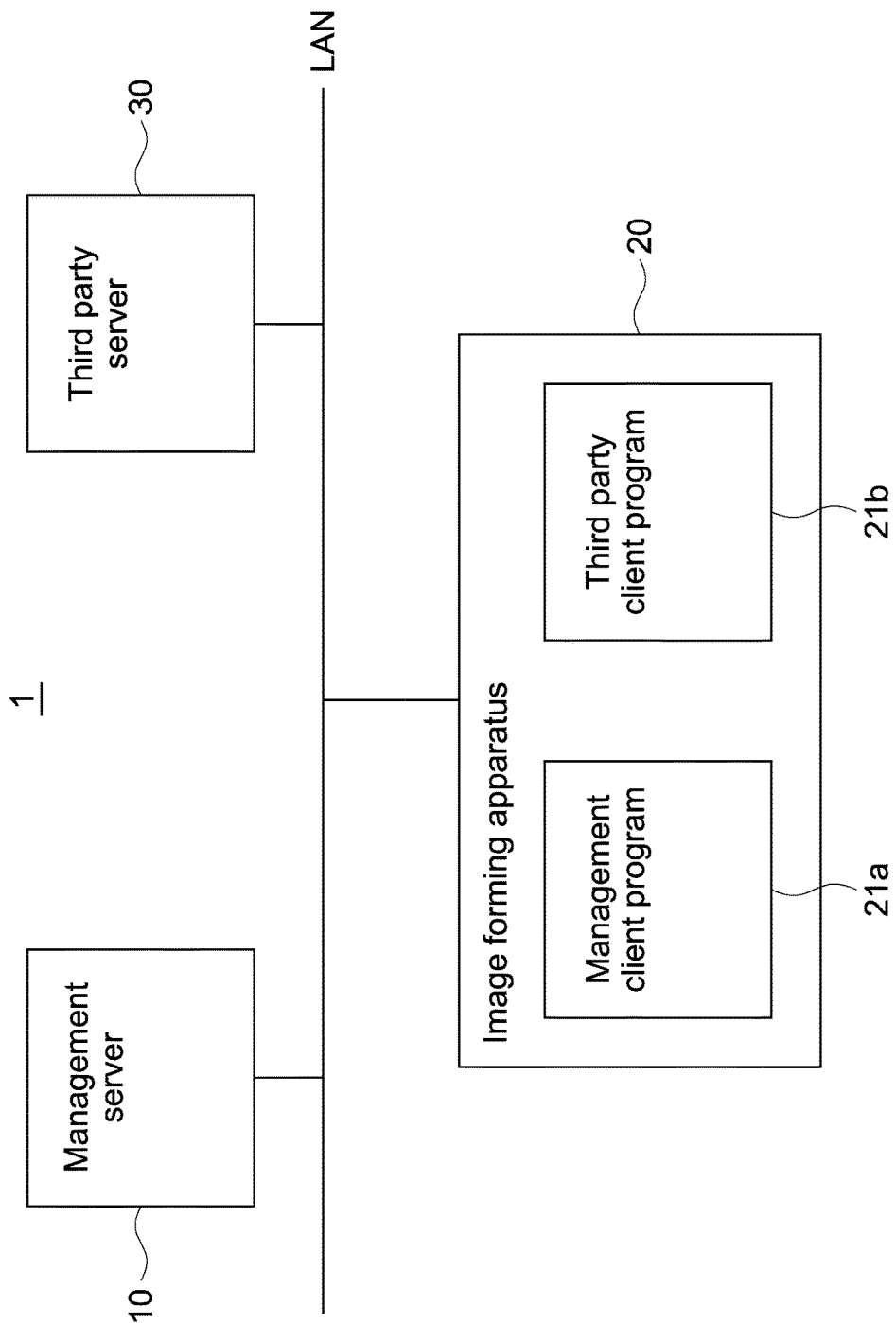
FIG. 1 shows a schematic diagram of an entire configuration of the authentication system 1 according to an embodiment of the present disclosure.

Firstly, an entire configuration of an authentication system according to an embodiment will be described. FIG. 1 shows a schematic diagram of an entire configuration of the authentication system 1 according to an embodiment of the present disclosure.

The authentication system 1 includes the management server 10, the image forming apparatus 20, and the third party server 30 connected to a LAN (Local Area Network).

A plurality of application programs, which are not pre-installed, are installed in the image forming apparatus 20 to be used.

In order to use those application programs, firstly, a user has to log in to the management client program 21a, i.e., one of the application programs, by using an operation panel of the image forming apparatus 20.

The management client program 21a uses the management server 10 in order to authenticate a user when the user logs in.

The third party client program 21b is one of the application programs and is supplied from a third party. The third party client program 21b executes specific process in cooperation with the third party server 30 connected to the LAN.

Where a single-sign-on function is not used, a user logs in to the management client program 21a by using a user name, a password, and the like, then starts up the third party client program 21b by using a displayed operation window, and has to input a user name, a password, and the like again in the third party client program 21b to log in to the third party client program 21b.

According to the authentication system 1 of the embodiment of the present disclosure, once a user logs in to the management client program 21a, when newly starting up another third party client program 21b, the login procedure to the third party client program 21b may be omitted.

The entire configuration of the authentication system 1 according to the embodiment of the present disclosure has been described above.

Figure 2:
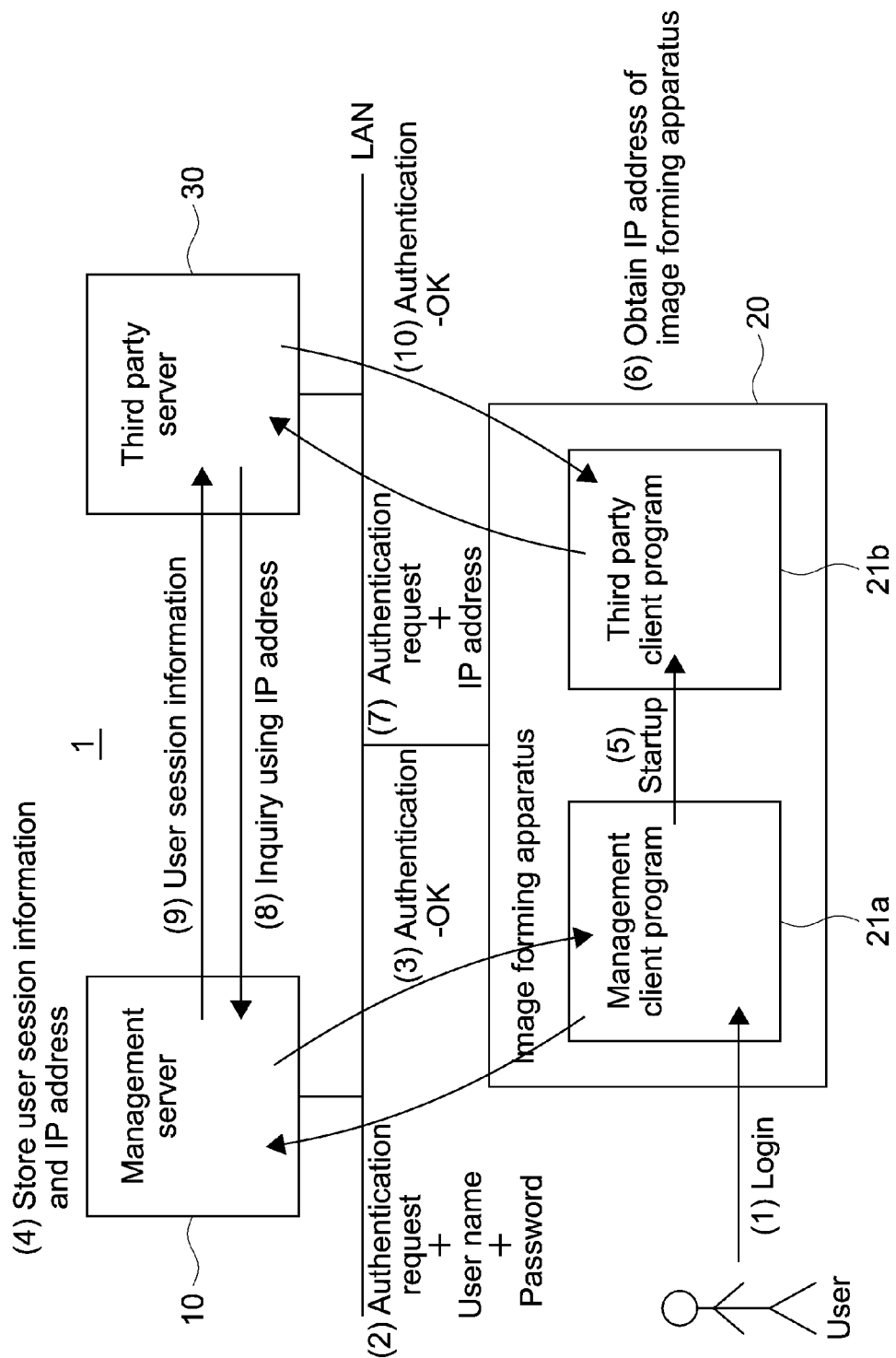
FIG. 2 shows a schematic diagram of a flow of the process of the authentication system 1 according to the embodiment of the present disclosure.

Next, a schematic flow of the process of the authentication system 1 according to the embodiment of the present disclosure will be described. FIG. 2 shows a schematic diagram of a flow of the process of the authentication system 1 according to the embodiment of the present disclosure.

(1) Firstly, a user logs in to the management client program 21a by using an operation panel of the image forming apparatus 20.

(2) Next, the management client program 21a sends an authentication request to the management server 10 by using a user name and a password input by the user.

(3) Next, the management server 10 authenticates the user, and returns authentication-OK when there is no problem. Up to the present process, login of the user to the management client program 21a is completed.

(4) The management server 10 stores the IP address of the image forming apparatus 20 and user session information generated in the user authentication process for single-sign-on.

(5) Next, in response to an instruction input by the user, the management client program 21a starts up the third party client program 21b.

(6) Next, the third party client program 21b obtains the IP address of the image forming apparatus 20, the third party client program 21b being running on the image forming apparatus 20.

(7) Next, the third party client program 21b sends the obtained IP address and an authentication request together to the third party server 30.

(8) Next, the third party server 30 makes an inquiry to the management server by using the received IP address.

(9) Next, the management server 10 selects user session information (including user name) corresponding to the IP address used for the inquiry, and returns the user session information to the third party server 30.

(10) Next, the third party server 30 authenticates the user by using the received user session information, and returns authentication-OK to the third party client program 21b.

As described above, only one user is capable of logging in to the image forming apparatus 20 of the authentication system 1. Therefore the user session information of the user logging in to the management client program 21a corresponds to the IP address of the image forming apparatus 20 one-to-one.

As a result, according to the single-sign-on function for the third party client program 21b, it is possible to search, by using the IP address of the image forming apparatus 20 as a key, the plurality of user session information items stored in the management server 10 for corresponding user session information, and to obtain the corresponding user session information.

The schematic flow of the process of the authentication system 1 according to the embodiment of the present disclosure has been described above.

Figure 3:
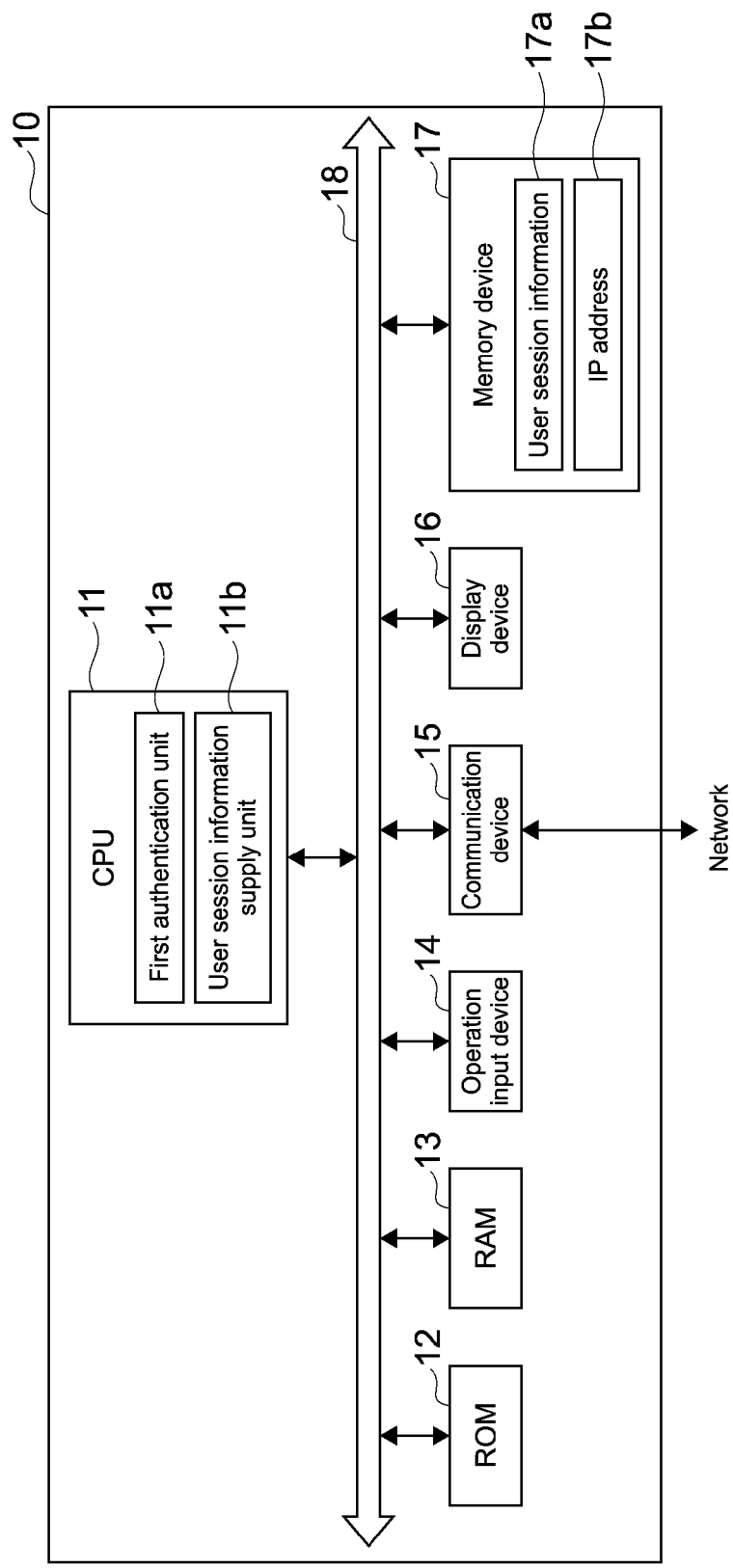
FIG. 3 shows a schematic diagram of a block configuration of the management server 10.

Next, a configuration of the management server 10 will be described. The management server 10 may include dedicated hardware and software, or may be a general-purpose computer. FIG. 3 shows a schematic diagram of a block configuration of the management server 10.

As shown in FIG. 3, the management server 10 includes the CPU (Central Processing Unit) 11, the ROM (Read Only Memory) 12, the RAM (Random Access Memory) 13, the operation input devices 14, the communication device 15 (second communication device), the display device 16, and the memory device 17, which are connected to each other via the bus 18.

The ROM 12 stores a plurality of programs such as firmware and data used to execute various kinds of process. The RAM 13 is used as a work area for the CPU 11, and temporarily stores the OS (Operating System), various applications being executed, and various data being processed.

The memory device 17 is, for example, an HDD (Hard Disk Drive), a flash memory, or another nonvolatile memory. The memory device 17 (third memory) stores the OS, various applications, various data, the user session information 17a, and the IP address 17b.

The user session information 17a is information obtained when the management client program 21a authenticates a user logging in, and includes a user name and the like.

The IP address 17b is an IP address of the image forming apparatus 20 with which the user session is established when a user logs in by using the management client program 21a.

The communication device 15 is connected to the network in order to send and receive information to and from the image forming apparatus 20 and the third party server 30.

In response to a command supplied from the operation input devices 14, the CPU 11 loads a corresponding program in the RAM 13 out of a plurality of programs stored in the ROM 12 (fourth memory) and the memory device 17 (fourth memory), and executes the loaded program to appropriately control the display device 16 and the memory device 17.

The operation input devices 14 include, for example, a pointing device such as a mouse, a keyboard, a touch panel, and other operation devices.

The display device 16 is, for example, a liquid crystal display, an EL (Electro-Luminescence) display, a plasma display, or the like.

The CPU 11 (second processor) executes the management server program to thereby realize functional blocks, which will be described next.

The CPU 11 of the management server 10 realizes functional blocks including the first authentication unit 11a and the user session information supply unit 11b.

The first authentication unit 11a authenticates a user logging in to the image forming apparatus 20 in cooperation with the management client program 21a of the image forming apparatus 20.

More specifically, the first authentication unit 11a authenticates a user on the basis of an authentication request using a user name and a password received from the first authentication request unit 21d of the image forming apparatus 20. In addition, the first authentication unit 11a generates the user session information 17a, and stores the user session information 17a and the IP address 17b of the image forming apparatus 20 in the memory device 17.

In response to an inquiry using an IP address from the third party server 30, the user session information supply unit 11b supplies the user session information 17a obtained in a process of the user authentication process executed by the first authentication unit 11a.

The configuration of the management server 10 has been described above.

Figure 4:
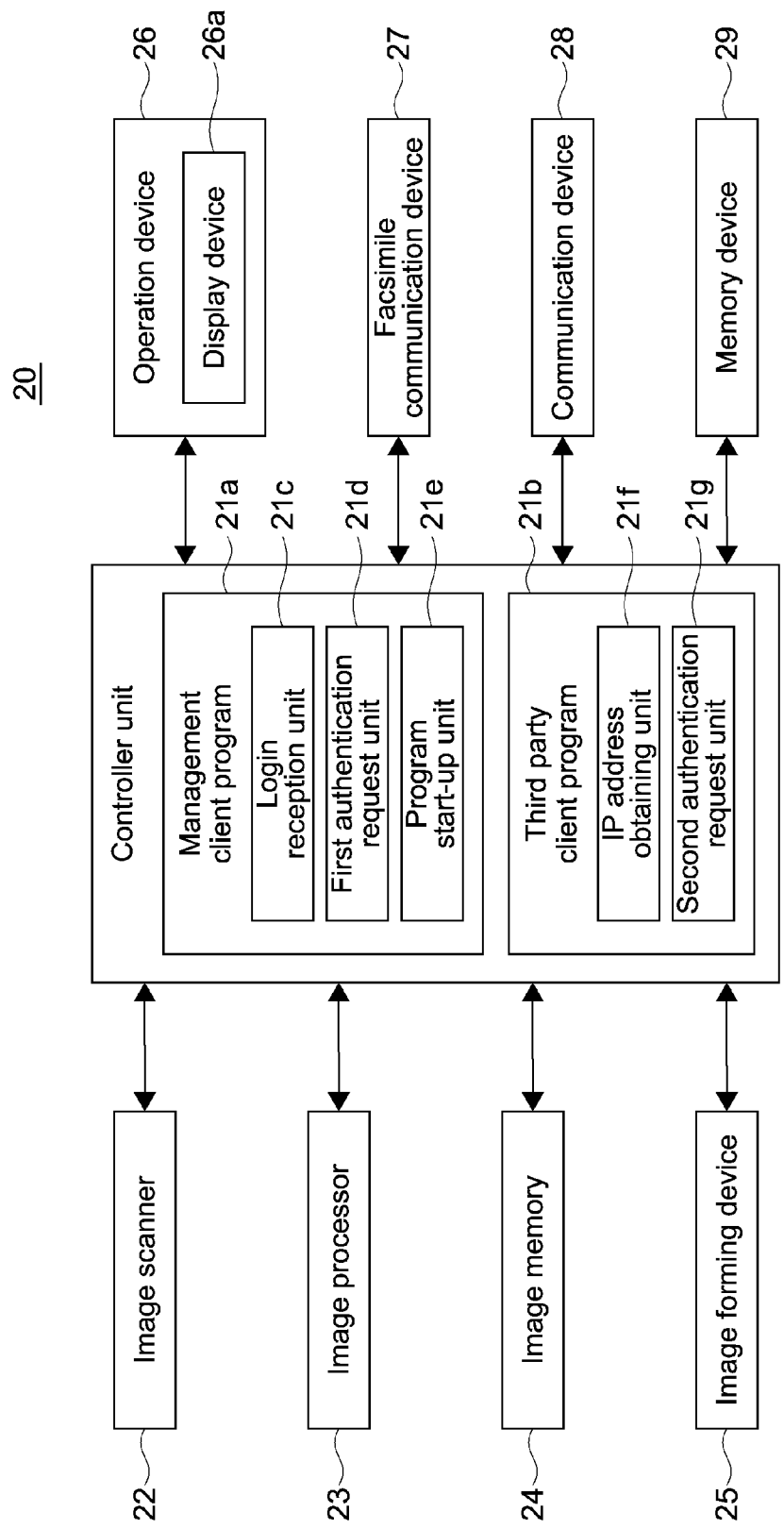
FIG. 4 shows a schematic diagram of a block configuration of the image forming apparatus 20.

Next, the configuration of the image forming apparatus 20 will be described. FIG. 4 shows a schematic diagram of a block configuration of the image forming apparatus 20.

The image forming apparatus 20 includes the controller unit 21. The controller unit 21 includes a CPU, a RAM, a ROM, a dedicated hardware circuit, and the like, and controls overall operations of the image forming apparatus 20.

The controller unit 21 is connected to the image scanner 22, the image processor 23, the image memory 24, the image forming device 25, the operation devices 26, the display device 26a, the facsimile communication device 27, the communication device 28 (first communication device), the memory device 29, and the like. The controller unit 21 controls the connected devices to operate, and sends and receives signals or data to and from the devices.

In response to job execution instructions input by a user via the operation device 26, a PC connected to the network, or the like, the controller unit 21 controls driving and processing of the mechanisms necessary to execute operational control of the respective functions such as a scanner function, a print function, a copy function, and a facsimile sending and receiving function.

Further, the controller unit 21 includes the management client program 21a and the third party client program 21b. The CPU loads the programs stored in the ROM in the RAM and executes the programs to thereby realize the functional blocks including the management client program 21a and the third party client program 21b.

The CPU (first processor) of the controller unit 21 loads the management client program 21a stored in the ROM or the like (first memory) in the RAM, and executes the management client program 21a to thereby operate as the login reception unit 21c, the first authentication request unit 21d, and the program start-up unit 21e. The management client program 21a is an application program that authenticates a user logging in by using the operation device 26 in cooperation with the management server 10.

The login reception unit 21c receives login of a user via the operation device 26.

The first authentication request unit 21d sends an authentication request to the first authentication unit 11a of the management server 10 by using a user name and a password received from the login reception unit 21c.

The program start-up unit 21e starts up the installed third party client program 21b in response to an instruction input by a user via the operation device 26.

The CPU (first processor) of the controller unit 21 loads the third party client program 21b stored in the ROM or the like (second memory, the first memory being the same as or different from the second memory) in the RAM, and executes the third party client program 21b to thereby operate as the IP address obtaining unit 21f and the second authentication request unit 21g. The third party client program 21b is an application program supplied from a third party, and operates in cooperation with the third party server 30.

The IP address obtaining unit 21f obtains the IP address of the image forming apparatus 20, the third party client program 21b being running on the image forming apparatus 20.

The second authentication request unit 21g sends the IP address obtained by the IP address obtaining unit 21f and an authentication request together to the third party server 30.

The image scanner 22 captures an image from a document.

The image processor 23 as necessary processes an image of image data of the image captured by the image scanner 22. For example, the image processor 23 corrects shading of an image captured by the image scanner 22 to improve the quality of the formed image.

The image memory 24 has an area for temporarily storing document image data captured by the image scanner 22, and an area for temporarily storing data to be printed by the image forming device 25.

The image forming device 25 forms an image of image data captured by the image scanner 22, for example.

The operation devices 26 include a touch panel unit and an operation key unit that receive, from a user, instructions of various operations and process that the image forming apparatus 20 can execute. The touch panel unit includes the display device 26a such as an LCD (Liquid Crystal Display) with a touch panel.

The facsimile communication device 27 includes an encoder/decoder, a modulator/demodulator, and an NCU (Network Control Unit) (not shown), and sends facsimile via a public telephone network.

The communication device 28 includes a communication module such as a LAN board. The communication device 28 sends and receives various data to and from apparatuses (PCs, etc.) such as the management server 10 and the third party server 30 via the LAN and the like connected to the communication device 28.

The memory device 29 stores document images captured by the image scanner 22 and other data. The memory device 29 is a large volume memory device such as an HDD.

The configuration of the image forming apparatus 20 has been described above.

Figure 5:
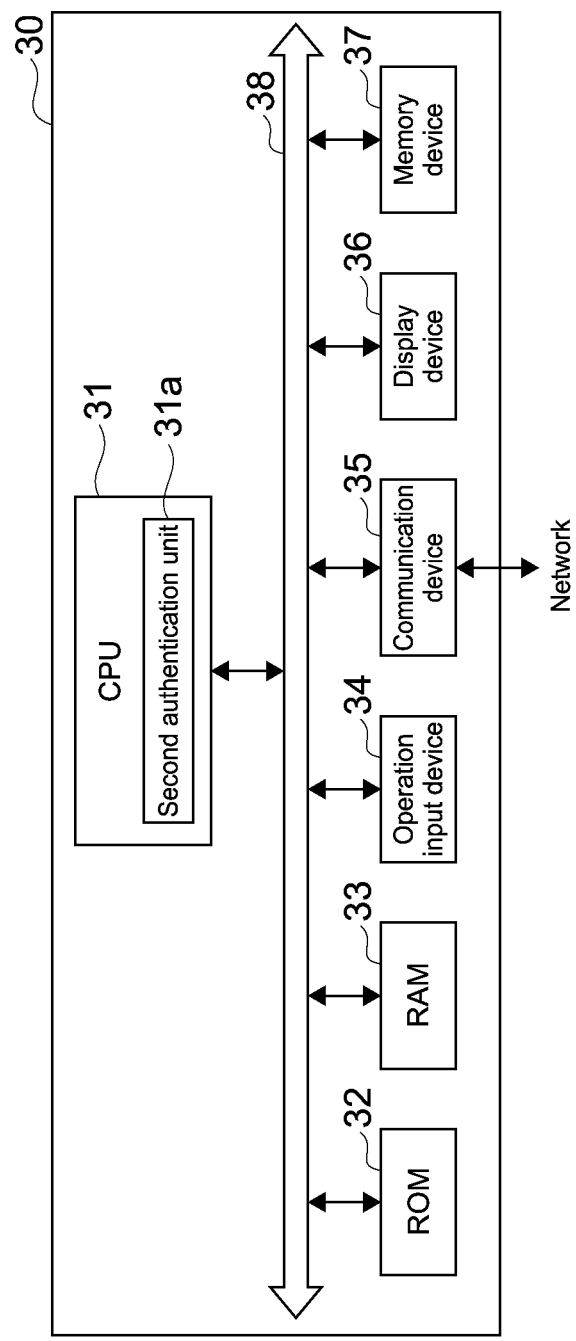
FIG. 5 shows a schematic diagram of a block configuration of the third party server 30.

Next, a configuration of the third party server 30 will be described. The third party server 30 may include dedicated hardware and software, or may be a general-purpose computer. FIG. 5 shows a schematic diagram of a block configuration of the third party server 30.

As shown in FIG. 5, the third party server 30 includes the CPU 31, the ROM 32, the RAM 33, the operation input devices 34, the communication device 35 (third communication device), the display device 36, and the memory device 37, which are connected to each other via the bus 38.

The ROM 32 stores a plurality of programs such as firmware and data used to execute various kinds of process. The RAM 33 is used as a work area for the CPU 31, and temporarily stores the OS, various applications being executed, and various data being processed.

The memory device 37 is, for example, an HDD, a flash memory, or another nonvolatile memory. The memory device 37 stores the OS, various applications, and various data.

The communication device 35 is connected to the network in order to send and receive information to and from the image forming apparatus 20 and the management server 10.

In response to a command supplied from the operation input devices 34, the CPU 31 loads a corresponding program in the RAM 33 out of a plurality of programs stored in the ROM 32 (fifth memory) and the memory device 37 (fifth memory), and executes the loaded program to appropriately control the display device 36 and the memory device 37.

The operation input devices 34 include, for example, a pointing device such as a mouse, a keyboard, a touch panel, and other operation devices.

The display device 36 is, for example, a liquid crystal display, an EL display, a plasma display, or the like.

The CPU 31 (third processor) executes the third party server program to thereby realize functional blocks, which will be described next.

The CPU 31 of the third party server 30 realizes a functional block, i.e., the second authentication unit 31a.

The second authentication unit 31a realizes the single-sign-on function for a user logging in to the image forming apparatus 20 in cooperation with the third party client program 21b of the image forming apparatus 20.

More specifically, the second authentication unit 31a receives an authentication request using an IP address from the second authentication request unit 21g of the image forming apparatus 20. In addition, the second authentication unit 31a makes an inquiry to the user session information supply unit 11b of the management server 10 by using the IP address. The second authentication unit 31a authenticates a user on the basis of returned user session information.

The configuration of the third party server 30 has been described above.

Figure 6:
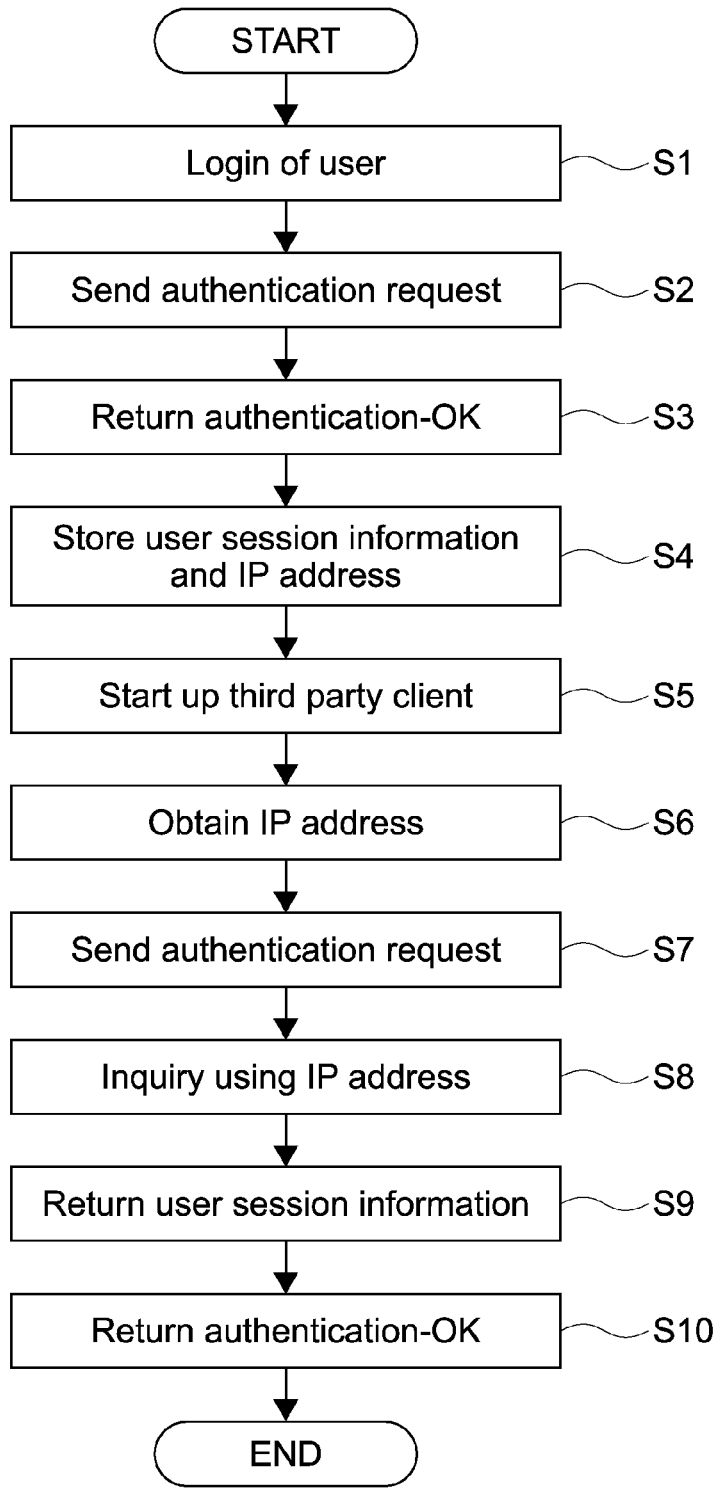
FIG. 6 shows a flow chart of the process of the authentication system 1.

Next, a detailed flow of the process of the authentication system 1 will be described. FIG. 6 shows a flow chart of the process of the authentication system 1.

Firstly, the login reception unit 21c receives login of a user via the operation device 26 (Step S1).

Next, the first authentication request unit 21d sends a user name and a password input by the user and an authentication request together to the first authentication unit 11a of the management server 10 (Step S2).

Next, the first authentication unit 11a authenticates the user by using the received user name and password. Where the first authentication unit 11a succeeds in authentication, the first authentication unit 11a returns an authentication-OK message to the first authentication request unit 21d (Step S3).

Where the first authentication unit 11a succeeds in authentication, the first authentication unit 11a stores the IP address 17b of the image forming apparatus 20, which sent the authentication request, and the user session information 17a obtained in a process of authentication in the memory device 17 (Step S4).

Next, the program start-up unit 21e starts up the third party client program 21b on the basis of an instruction input by the user (Step S5).

Next, the IP address obtaining unit 21f of the third party client program 21b obtains the IP address of the image forming apparatus 20, the third party client program 21b being running on the image forming apparatus 20 (Step S6).

Next, the second authentication request unit 21g sends the obtained IP address and an authentication request together to the second authentication unit 31a of the third party server 30 (Step S7).

Next, the second authentication unit 31a makes an inquiry to the user session information supply unit 11b of the management server 10 by using the received IP address (Step S8).

Next, the user session information supply unit 11b obtains the user session information 17a corresponding to the received IP address from the memory device 17, and returns the user session information 17a to the second authentication unit 31a (Step S9).

Next, the second authentication unit 31a authenticates the user by using the returned user session information 17a. Where the second authentication unit 31a succeeds in authentication, the second authentication unit 31a returns an authentication-OK message to the second authentication request unit 21g (Step S10).

The detailed flow of the process of the authentication system 1 has been described above.

As described above, according to the present embodiment, the authentication system 1 includes the management server 10, the image forming apparatus 20, and the third party server 30 connected to a network. The image forming apparatus 20 includes the first communication device 28 capable of communicating via the network, the operation devices 26, the display device 26a, the management client program 21a that operates in cooperation with the management server 10, and the third party client program 21b that operates in cooperation with the third party server 30. The management client program 21a includes the login reception unit 21c, the first authentication request unit 21d, and the program start-up unit 21e. The login reception unit 21c receives login of a user. The first authentication request unit 21d sends an authentication request to the management server 10 by using a user name and a password received from the login reception unit 21c. The program start-up unit 21e starts up the third party client program 21b on the basis of an instruction input by a user via the operation device 26. The third party client program 21b includes the IP address obtaining unit 21f and the second authentication request unit 21g. The IP address obtaining unit 21f obtains the IP address 17b of the image forming apparatus 20, the third party client program 21b being running on the image forming apparatus 20. The second authentication request unit 21g sends the IP address 17b obtained by the IP address obtaining unit 21f and an authentication request together to the third party server 30. The management server 10 includes the second communication device 15 capable of communicating via the network, the memory device 17, the first authentication unit 11a, and the user session information supply unit 11b. The first authentication unit 11a authenticates the user on the basis of the authentication request using the user name and the password received from the first authentication request unit 21d of the image forming apparatus 20, generates the user session information 17a obtained in a process of the user authentication process, and stores the user session information 17a in association with the IP address 17b of the image forming apparatus 20 in the memory device 17. The user session information supply unit 11b supplies the user session information 17a in response to an inquiry using the IP address 17b from the third party server 30. The third party server 30 includes the third communication device 35 capable of communicating via the network, and the second authentication unit 31a. The second authentication unit 31a receives the authentication request using the IP address 17b from the second authentication request unit 21g of the image forming apparatus 20, makes an inquiry to the user session information supply unit 11b of the management server 10 by using the IP address 17b, and authenticates the user on the basis of the returned user session information 17a.

Therefore it is possible to realize a simple single-sign-on function used for application programs running on an image forming apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. An authentication system, comprising:
a management server;
an image forming apparatus; and
a third party server, wherein
the image forming apparatus includes
a first communication device capable of communicating via a network,
an operation device,
a display device,
a first memory that stores a management client program that operates in cooperation with the management server,
a second memory that stores a third party client program that operates in cooperation with the third party server, and
a first processor that executes the management client program and the third party client program,
when the first processor executes the management client program, the first processor
receives login of a user,
sends an authentication request to the management server by using a received user name and password, and
starts up the third party client program on the basis of an instruction input by a user via the operation device,
when the first processor executes the third party client program, the first processor
obtains an IP address of the image forming apparatus, the third party client program being running on the image forming apparatus, and
sends the IP address and the authentication request together to the third party server,
the management server includes
a second communication device capable of communicating via the network,
a third memory,
a fourth memory that stores a management server program, and
a second processor that executes the management server program,
when the second processor executes the management server program, the second processor
authenticates the user on the basis of the authentication request using the user name and the password received from the image forming apparatus,
generates user session information obtained in a process of the user authentication process,
stores the user session information in association with the IP address of the image forming apparatus in the third memory, and
supplies the user session information in response to an inquiry using the IP address from the third party server,
the third party server includes
a third communication device capable of communicating via the network,
a fifth memory that stores a third party server program, and
a third processor that executes the third party server program, and
when the third processor executes the third party server program, the third processor
receives the authentication request using the IP address from the image forming apparatus,
makes an inquiry to the management server by using the IP address, and
authenticates the user on the basis of the returned user session information.

2. The authentication system according to claim 1, wherein
one user logs in to the management client program at a time, and
the user session information of the user logging in to the management client program corresponds to the IP address of the image forming apparatus one-to-one.

3. The authentication system according to claim 2, wherein the third memory of the management server stores a plurality of user session information items, and when the second processor executes the management server program, the second processor searches, by using the IP address from the third party server as a key, the plurality of user session information items stored in the third memory for corresponding user session information, and obtains the corresponding user session information.

4. An authentication method of an authentication system including a management server, an image forming apparatus, and a third party server connected to a network, the authentication method comprising:

via the image forming apparatus, receiving login of a user;

via the image forming apparatus, sending an authentication request to the management server by using a received user name and password;

via the management server, authenticating the user on the basis of the authentication request using the user name and the password received from the image forming apparatus, generating user session information obtained in a process of the user authentication process, and storing the user session information in association with the IP address of the image forming apparatus in the memory device;

via the image forming apparatus, starting up a third party client program on the basis of an instruction input by a user via the operation device;

when executing the third party client program, obtaining an IP address of the image forming apparatus, the third party client program being running on the image forming apparatus;

when executing the third party client program, sending the IP address and the authentication request together to the third party server;

via the third party server, receiving the authentication request using the IP address from the image forming apparatus, and making an inquiry to the management server by using the IP address;

via the management server, supplying the user session information in response to an inquiry using the IP address from the third party server; and via the third party server, authenticating the user on the basis of the returned user session information.

* * * * *